United States Patent Office 2,870,232
Patented Jan. 20, 1959

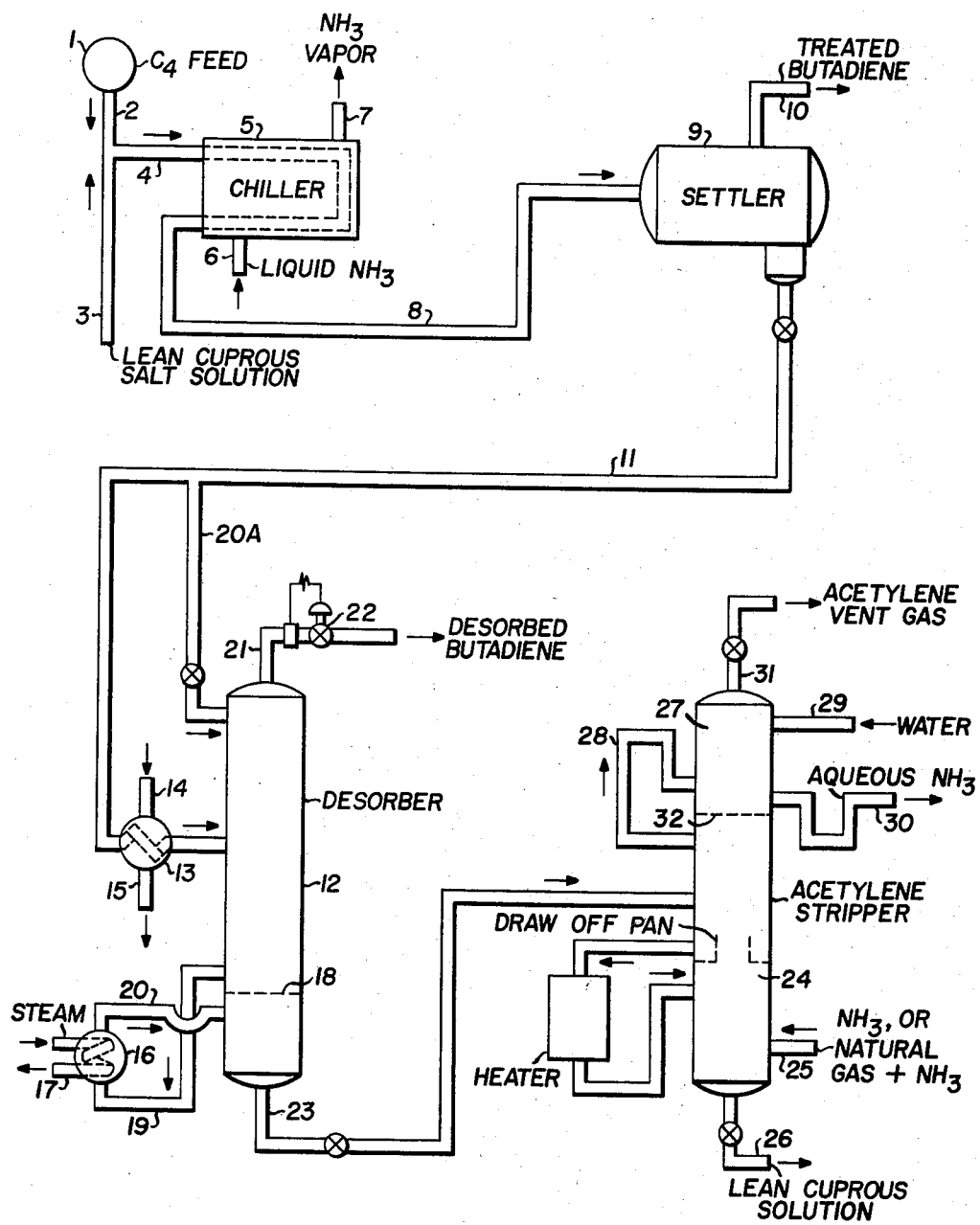

2,870,232

ACETYLENE REMOVAL FROM DIOLEFIN STREAMS

Samuel Winfield Wilson and Stephen John Bodnar, Baton Rouge, La., assignors to Esso Research and Engineering Company, a corporation of Delaware Application December 14, 1955, Serial No. 553,020

6 Claims. (Cl. 260—681.5)

The present invention relates to the use of a prewash system for removal of acetylenes from a diolefin-bearing stream prior to extraction of the diolefin, such as butadiene, in an extraction plant, particularly in a plant employing an aqueous cuprous ammonium acetate solution or similar kind of solvent. More particularly, the present invention relates to an improved process wherein the absorbed acetylenes may be recovered and regenerated without significant polymerization in the absorbing liquid, thus fouling the latter.

In the process for purifying crude butadiene, e. g. 10-50% butadiene-1,3 admixed with butylenes, butenes, butadiene-1,2, methylacetylene and/or ethyl acetylene, and/or vinyl acetylene which employ ammoniacal cuprous acetate in a countercurrent vapor phase or liquid phase extraction process, the acetylenes are not only undesirable impurities in the butadiene product but result in contamination of the cuprous ammonium acetate solution. This contamination results in considerable fouling in the equipment as well as considerable foaming and solution carry-over in the final desorption steps. To off-set this fouling and foaming, the solution may be contacted with activated carbon, or extracted with water insoluble oxygenated materials to remove the fouling and foaming producing materials. This procedure results in considerable recurrent expense and when the crude butadiene contains appreciable acetylenes, i. e. 500 p. p. m. or more, in exorbitant expenditures, or loss in extraction plant capacity.

The process to which this invention applies involves precontacting in the liquid or vapor phase the crude butadiene with a small amount of ammoniacal cuprous acetate in which the ratio of cuprous ions to acetylenes is such that the treated crude butadiene is essentially free of acetylenes, i. e. contains 100 parts per million or less and the solution contains an excess of ammonium acetate. The pretreated crude butadiene is then fed to a liquid-liquid or vapor phase purification plant wherein the product butadiene will then contain 100 p. p. m. or less of acetylenes. If it is not considered desirable or advantageous to produce butadiene this low in acetylenes the ratio of cuprous ions to acetylenes may be changed to give a treated feed containing a higher quantity of acetylenes.

In the precontacting process for acetylene removal the crude butadiene prior to being fed to a butadiene purification unit is mixed with lean ammoniacal cuprous acetate solution preferably in the liquid phase in a mixing device at 60-90° F. After the mixture passes through the first stages of mixing, the mixture is chilled while still mixing or contacting to 30° F.–55° F. to improve the pick-up of acetylenes. The mixture of crude butadiene and ammoniacal cuprous acetate solution is passed to a settler. The ammoniacal cuprous acetate is passed on to a desorber where the temperature is raised to reject most of the absorbed butadiene with very small amounts of acetylene. The degree of desorption is controlled by heat, 130–160° F. and/or pressure, 15–35 p. s. i. g. and/or refluxing with cool or cold reflux.

The desorber may have a bottoms reboiler. The tower bottoms is pumped or flows by pressure differential to the acetylene stripper through a preheater where the solution is heated to 170–200° F. and $NH_3$ is added and the solution flashes into the tower or knockout pot which operates at 1–5 p. s. i. g. The tower may or may not be packed or contain plates. A flash pot or a series of flash pots and interstage reheating may be used. A sparger to introduce ammonia and or natural gas and/or steam is used in the second flash stage being introduced below the liquid level. The solution from the stripper which is essentially free or free of acetylenes (or acetylides) flows through a charcoal drum, a filter, to a solution storage drum and back to the contactor. The use of charcoal may or may not be necessary depending on the amount of acetylene polymerization occurring during the desorbing and stripping process or the extent to which the solution is not completely desorbed. Sufficient excess $NH_3$ or $NH_3$ and natural gas must be added in the stripping system to avoid excessive acetylene concentrations in the equipment where it is in contact with the cuprous acetate solution.

In this precontacting process, herein referred to as an acetylene removal unit, it has been discovered that to regenerate properly the acetylenes absorbed in the ammoniacal cuprous acetate, it is necesasry to maintain a certain ratio of excess ammonium acetate to dissolved acetylene if the acetylenes are to be completely regenerated from the ammoniacal cuprous acetate solution. The excess ammonium acetate refers to the quantity of ammonium acetate in excess of that required to satisfy and to maintain the copper as dissolved copper (cuprous and cupric) in the ammoniacal cuprous acetate solution. If the cuprous ammonium acetate solution does not contain the predetermined excess of ammonium acetate the acetylenes cannot be completeley or essentially completely regenerate. When acetylene regeneration is not complete, the solution becomes fouled which leads to difficulties in the acetylene removal equivalent to those in a butadiene purification unit when the acetylenes are not removed. In addition, if the acetylenes are not completely regenerated some of the polymer from the unregenerated acetylenes is extracted from the solution by the crude butadiene in the precontacting step and thereby introduced into the butadiene purification unit.

It has now been found that in order to remove by regeneration substantially completely the acetylenes from the copper ammonium acetate solution, it is necessary to maintain in the wash solution an excess amount of ammonium acetate in the ratio of excess mols of ammonium acetate to mols acetylene per liter of solution of at least 15/1 and preferably about 40/1 and not over 60/1. It has been found that when there is no excess ammonium acetate, or where the excess is less than about 15/1, acetylene removal is unsatisfactory and either polymerization occurs, or acetylene is not removed from the wash liquid, thus reducing its activity for further scrubbing or prewashing the butadiene containing stream.

A flow plan of means used in the prewash system is shown in the attached drawing.

The acetylene-contaminated butadiene-bearing stream from drum 1 is passed by line 2 to be mixed with a stream of lean cuprous ammonium acetate solution containing the excess ammonium acetate from line 3 and the resulting mixture is passed by line 4 through a chiller 5. A suitable refrigerant such as liquid ammonia is supplied by line 6 to the chiller. The refrigerant, e. g. ammonia vapor, following heat exchange is removed by line 7 from chiller 5.

The butadiene-bearing stream should be preferably mixed with a minor proportion of the lean solvent, e. g. preferably about six parts by weight of hydrocarbon to one of the solvent (cuprous ammonia acetate solution) or in the range of 3 to 8 parts hydrocarbon to 1 part solvent. This mixture is chilled in the chiller 5 preferably to about 40° F. or in the range of 20° to 50° F., and at such a temperature is transferred by line 8 to the settler drum 9, wherein the hydrocarbon phase is separated from the aqueous cuprous ammonium acetate solution containing absorbed acetylenes and a small amount of absorbed butadiene. Residence time for the chilling and settling of the mixture of the hydrocarbon stream and the aqueous cuprous ammonium acetate solution may be 5 to 15 minutes. The liquid hydrocarbon substantially free of acetylenes is decanted or drawn overhead from the settler 9 through line 10 for processing in a butadiene extraction plant.

The aqueous solution of cuprous ammonium acetate containing the absorbed acetylenes with a very small amount of absorbed butadiene is withdrawn from the bottom of the settler 9 through line 11 and is introduced into a packed desorber tower 12. This tower 12 is provided with a preheater 13 which receives steam from line 14 for heat exchange and is drained by line 15. A reboiler 16 is provided with a steam heating coil 17 for supplying heat to a bottoms fraction withdrawn from a plate 18 at the bottom portion of tower 12 through line 19 and the reheated bottoms portion is recycled by line 20. A controlled amount of cold reflux may be passed into the upper part of tower 12 by line 20a. The desorbed gaseous butadiene is withdrawn from the top of tower 12 through line 21 provided with a pressure control valve 22. By control of the variables of preheat, reflux, tower pressure and bottoms temperature a maximum desorption and recovery of the butadiene is accomplished with minimum acetylene rejection at this stage. The desirable butadiene taken overhead from tower 12 has sufficient purity to be blended with the product butadiene recovered in the butadiene extraction plant. The preheater, reboiler and tower are preferably designed for minimum holdup to lessen the opportunity for polymerization of acetylene. Acetylene polymerization increases the difficulty of subsequent removal of acetylene from the extraction solution. Low pressures in tower 12 of the order of about 15 p. s. i. g. (range: 0 to 30 p. s. i. g.) permits rejection of the butadiene at moderate temperature. The feed and bottom temperatures of tower 12 may be of the order of 160° F. (range: 140° to 180° F.), and the overhead vapor temperature may be of the order of 70° F. (range: 50° to 90° F.).

The solution retaining the acetylenes withdrawn from the bottom of desorber tower 12 by line 23 is introduced into acetylene stripper tower 24. Tower 24 may be operated at close to atmospheric pressure to cause the acetylenes to vaporize from the solution as it is passed into the intermediate part of tower 24. Stripping of the acetylenes from the solution in tower 24 is assisted by introduction of gaseous ammonia with or without the further introduction of an inert gas, e. g., natural gas, or a gaseous $C_1$-$C_4$ paraffinic hydrocarbon at the bottom of the tower 24 by line 25. Accordingly, a substantially complete rejection of the acetylenes from the solution is accomplished in tower 24. This vessel may be at a temperature of about 170°–200° F. The acetylene-free solution is withdrawn from the bottom of stripping column 24 by line 26 and may be recycled as lean solution in this part of the system. If desired, any small amount of polymers present in this lean solution may be removed by filtering through an absorbent such as char or clay type absorbents.

The acetylenes passed up through the tower 24 may be scrubbed in a scrubbing section 27 by being passed thereto by line 28. This scrubbing section is provided with an inlet 29 for water and a drain 30 for aqueous solution of ammonia which is scrubbed from the acetylene bearing gases. The residue of the acetylene bearing gases is vented through line 31 to be rejected from the system. Partition 32 separates the scrubbing section 27 from the stripping section below in column 24.

Typical streams which are advantageously scrubbed by the process of the present invention may have the following composition:

Acetylenes in untreated feed, p. p. m._____ 800 to 3000
Ratio of hydrocarbons to solution lbs./lb___ 2/1 to 10/1
Concentration of diolefin in hydrocarbon, mol. percent _____ 12 to 40

The aqueous scrubbing or washing solution of the present invention may have the following composition:

| Component: | Range (as mols/liter) |
|---|---|
| Cupric copper | .05 to .35 |
| Cuprous copper | 1.5 to 2.5 |
| Ammonia | 8.0 to 12.0 |
| Acetate (as acetic acid) | 5.0 to 7.0 |

What is essential is that ammonium acetate in the scrubbing liquor be present in excess of that required to satisfy the copper content, and that the ratio of excess ammonium acetate to acetylides in the solution be at least 15/1 and preferably 30–40/1. Also, it is desirable to maintain about 1–2 mols free $NH_3$, as $NH_4OH$.

The process of the present invention may be more clearly understood from the specific example shown in the table wherein solutions of copper ammonium acetate employed in removing acetylenes from the diolefin stream were stripped in the manner described in the specification to regenerate and reject the acetylene.

TABLE I

*Laboratory acetylene stripper runs*

| Test No. | Solution Feed Composition [1] | | | | | Acetylides Remaining After Stripper | Acetylide Rejection, Percent | Moles Free $NH_4Ac$/Mole Acetylenes |
|---|---|---|---|---|---|---|---|---|
| | Cu++ | Total Cu | NH$_3$ | Ac− | Acetylides | | | |
| 1 | 0.31 | 3.35 | 10.32 | 3.95 | 0.055 | 0.020 | 64 | 5.3 |
| 2 | 0.30 | 2.68 | 11.02 | 3.17 | 0.150 | 0.080 | 47 | 1.3 |
| 3 | 0.29 | 2.62 | 10.65 | 4.06 | 0.080 | <0.005 | 94 | 14.4 |
| 4 | 0.33 | 2.55 | 11.13 | 5.90 | 0.070 | <0.005 | complete | 43.2 |
| 5 | 0.33 | 3.27 | 9.29 | 3.48 | 0.140 | 0.070 | 50 | 0 |
| 6 | 0.08 | 3.18 | 10.96 | 4.03 | 0.10 | 0.030 | 70 | 7.7 |
| 7 | 0.21 | 2.68 | 11.29 | 4.67 | 0.10 | 0.010 | 90 | 17.8 |

[1] Molarity shown for Cu++, Cu, NH$_3$, acetate and acetylides.

These data clearly show that when the ammonium acetate/acetylene ratio is under 10, regeneration of acetylene did not exceed about 70%. As the ratio exceeds this lower limit, the regeneration increases so that when it is about 40/1, regeneration is complete. The upper limit of the desired ratio is set by solubility considerations, and is about 60/1.

The process of the present invention may be modified in many ways obvious to those skilled in the art. Thus, it may be desirable to contact the cuprous ammonium acetate solution at elevated temperatures either before or after the butadiene desorption step with butenes or some other hydrocarbon. This serves to extract from the copper solution any small amount of polymer which may have formed in the system. Contacting is preferably carried out in a liquid-liquid phase.

What is claimed is:

1. In a prewashing operation wherein acetylenic compounds are removed from a diolefin-rich stream by extraction of said streams in an extraction zone with an aqueous ammoniacal copper salt solution to form an extract containing said acetylenic compounds and a minor amount of said diolefins, and wherein said extract is stripped in a stripping zone to recover acetylenes, the improvement which comprises prewashing said stream with a copper ammonium acetate solution containing at least 15 moles of ammonium acetate, in excess of that required to maintain the copper salt in solution, per mole of acetylenes in said stream.

2. The process of claim 1 wherein said excess is in the range of from about 15 to about 60 mols of ammonium acetate per mol of acetylenes.

3. The process of claim 1 wherein said excess is about 30–40 to 1.

4. The process of claim 1 wherein said acetylenes are stripped from said extract with ammonia-comprising gas.

5. The process of claim 1 wherein said extracting solution also contains 1–2 mols of free ammonia.

6. The process of claim 1 wherein said stripping zone is maintained at a temperature of from about 170–200° F.

References Cited in the file of this patent

UNITED STATES PATENTS

| | | |
|---|---|---|
| 2,566,135 | Morrell et al. | Aug. 28, 1951 |
| 2,566,136 | Morrell | Aug. 28, 1951 |
| 2,788,378 | Cotton et al. | Apr. 9, 1957 |